United States Patent
Master et al.

(10) Patent No.: US 8,856,148 B1
(45) Date of Patent: Oct. 7, 2014

(54) SYSTEMS AND METHODS FOR DETERMINING UNDERPLAYED AND OVERPLAYED ITEMS

(75) Inventors: Aaron Steven Master, Palo Alto, CA (US); Joel Gedalius, San Jose, CA (US)

(73) Assignee: SoundHound, Inc., Santa Clara, CA (US)

(*) Notice: Subject to any disclaimer, the term of this patent is extended or adjusted under 35 U.S.C. 154(b) by 952 days.

(21) Appl. No.: 12/949,610

(22) Filed: Nov. 18, 2010

Related U.S. Application Data

(60) Provisional application No. 61/262,487, filed on Nov. 18, 2009.

(51) Int. Cl.
G06F 7/00 (2006.01)
G06F 17/30 (2006.01)

(52) U.S. Cl.
USPC .......................................... 707/752

(58) Field of Classification Search
USPC .............................. 707/752; 705/1
See application file for complete search history.

(56) References Cited

U.S. PATENT DOCUMENTS

| | | | |
|---|---|---|---|
| 5,969,283 A | 10/1999 | Looney et al. | |
| 5,974,409 A | 10/1999 | Sanu et al. | |
| 7,693,720 B2 | 4/2010 | Kennewick et al. | |
| 8,296,179 B1 | 10/2012 | Rennison | |
| 8,688,253 B2 | 4/2014 | Master et al. | |
| 8,694,534 B2 | 4/2014 | Mohajer | |
| 8,694,537 B2 | 4/2014 | Mohajer | |
| 2001/0014891 A1 | 8/2001 | Hoffert et al. | |
| 2002/0138630 A1* | 9/2002 | Solomon et al. | 709/228 |
| 2003/0078928 A1 | 4/2003 | Dorosario et al. | |
| 2003/0106413 A1 | 6/2003 | Samadani et al. | |
| 2004/0019497 A1* | 1/2004 | Volk et al. | 705/1 |
| 2004/0193420 A1 | 9/2004 | Kennewick et al. | |
| 2005/0016360 A1 | 1/2005 | Zhang | |
| 2005/0027699 A1 | 2/2005 | Awadallah et al. | |
| 2006/0155694 A1 | 7/2006 | Chowdhury et al. | |
| 2006/0242017 A1 | 10/2006 | Libes et al. | |
| 2007/0288444 A1 | 12/2007 | Nelken et al. | |
| 2008/0154951 A1 | 6/2008 | Martinez et al. | |
| 2008/0249982 A1 | 10/2008 | Lakowske | |

(Continued)

FOREIGN PATENT DOCUMENTS

| | | | |
|---|---|---|---|
| WO | WO 2008004181 A2 * | 1/2008 | |
| WO | WO2013177213 | 11/2013 | |

OTHER PUBLICATIONS

Wang, Avery Li-Chun, "An Industrial-Strength Audio Search Algorithm", In ISMIR 2003, 4th Symposium Conference on Music Information Retrieval (Oct. 26, 2003), pp. 7-13.

(Continued)

*Primary Examiner* — Jacob F Bétit
*Assistant Examiner* — Christy Lin
(74) *Attorney, Agent, or Firm* — Carr & Ferrell LLP

(57) ABSTRACT

Systems and methods for determining underplayed or overplayed items are provided herein. Instructions stored in memory are executed by a processor to: calculate short term scores for radio data and music identification service data of the items, determine linear distance and logarithmic distance between radio virtual radio plays per days on one million stations (VRPDOMS) and identification VRPDOMS of the items, identify and eliminate items lacking minimum requisite number of radio VRPDOMS or identification VRPDOMS, and sort the items by largest linear distance or largest logarithmic distance first. The sorted items are then transmitted to the computing device.

39 Claims, 3 Drawing Sheets

(56) References Cited

U.S. PATENT DOCUMENTS

| | | |
|---|---|---|
| 2008/0255937 A1 | 10/2008 | Chang et al. |
| 2009/0064029 A1 | 3/2009 | Corkran et al. |
| 2010/0205166 A1* | 8/2010 | Boulter et al. ............... 707/705 |
| 2010/0211693 A1 | 8/2010 | Master et al. |
| 2010/0250497 A1 | 9/2010 | Redlich et al. |
| 2011/0071819 A1 | 3/2011 | Miller et al. |
| 2012/0030199 A1 | 2/2012 | Mohajer |
| 2012/0232683 A1 | 9/2012 | Master et al. |
| 2012/0233157 A1 | 9/2012 | Mohajer |
| 2012/0233207 A1 | 9/2012 | Mohajer |
| 2013/0254029 A1 | 9/2013 | Mohajer |
| 2014/0019483 A1 | 1/2014 | Mohajer |

OTHER PUBLICATIONS

Venkatachalam, V., Cazzanti, L., Chillon, N., Wells, M., "Automatic Identification of Sound Recordings", Signal Processing Magazine, IEEE, Mar. 2004, 92-99, vol. 21, Issue 2.

Nelson, Jeffrey, "V Cast Song ID from Verizon Wireless". May 21, 2007.

Gracenote: MusicID, available at <http://www.gracenote.com/business_solutions/music_id/>, accessed Aug. 4, 2010.

Shazam: <http://web.archive.org/web/20100501190631/http://www.shazam.com/>, accessed May 1, 2010.

App Shopper Shazam: <http://appshopper.com/music/shazam>. May 23, 2013.

Gracenote Mobile MusicID: <http://web.archive.org/web/20100123211802/http://www.gracenote.com/business_solutions/mobileMusic/>, accessed Jan. 23, 2010.

App Shopper MusicID: <http://appshopper.com/music/musicid>. Feb. 8, 2013.

Wang. "The Shazam Music Recognition Service," Communications of the ACM(Magazine), Aug. 2006. vol. 49, No. 8, pp. 44-48. <http://dl.acm.org/citation.cfm?id=1145312>.

Xu et al. "Music Identification Via Vocabulary Tree with MFCC Peaks," MIRUM '11 Proceedings of the 1st international ACM workshop on Music information retrieval with user-centered and multimodal strategies, 2011. pp. 21-26. <http://dl.acm.org/citation.cfm?doid=2072529.2072537>.

Li et al. "Robust Audio Identification for MP3 Popular Music," SIGIR '10 Proceedings of the 33rd international ACM SIGIR conference on Research and development in information retrieval, Jul. 2010. pp. 627-634. <http://dl.acm.org/citation.cfm?doid=1835449.1835554>.

Yu et al. "A Query-By-Singing System for Retrieving Karaoke Music," IEEE Transactions on Multimedia, Dec. 2008, vol. 10, No. 8, pp. 1626-1637. <http://ieeexplore.ieee.org/xpl/articleDetails.jsp?arnumber=4694852>.

Casey et al. "Content-Based Music Information Retrieval: Current Directions and Future Challenges," Proceedings of the IEEE, 2008. vol. 96, No. 4, p. 668-696. <http://research.yahoo.com/pub/2649>.

Liu et al. "Content-Based Retrieval of MP3 Music Objects," CIKM '01 Proceedings of the tenth international conference on Information and knowledge management, 2001. pp. 506-511. <http://dx.doi.org/10.1145/502585.502670>.

OMRAS2—Ontology-Driven Music Retrieval & Annotation Sharing Service. Overview—Apr. 24, 2009 [Accessed Sep. 27, 2012—Archive.org] <http://web.archive.org/web/20090424083019/http://www.omras2.org/overview>.

OMRAS2 —AudioDB —Populating and Querying an AudioDB Instance, accessed Sep. 27, 2012, <http://omras2.org/audioDB/tutorial1>.

Benson et al. "Sync Kit: A Persistent Client-Side Database Caching Toolkit for Data Intensive Websites," Proceedings Of The 19th International Conference On World Wide Web, Apr. 2010. pp. 121-130. <http://dl.acm.org/citation.cfm?id=1772704>.

Larson et al. "NYT to Release Thesaurus and Enter Linked Data Cloud," NY Times Blogs, Jun. 2009, <http://open.blogs.nytimes.com/2009/06/26/nyt-to-release-thesaurus-and-enterlinked-data-cloud/>.

"Aurix Enhances Effectiveness Of Leading Search Software," Aurix.com—News. Jun. 1, 2010. <http://www.aurix.com/pages/3808/Aurix_enhances_effectiveness_of_leading_search_software.htm>.

"Hearing it Loud & Clear at SpeechTEK 2010," Aurix.com—News. Jul. 21, 2010. <http://www.aurix.com/pages/4161/State_of_the_art_speech_technology.htm>.

Jamil. "A Natural Language Interface Plug-In For Cooperative Query Answering In Biological Databases," BMC Genomics, Nov. 2011. (Accessed Sep. 27, 2012) <http://www.biomedcentral.com/147-2164/13/S3/S4>.

Feng. "A General Framework For Building Natural Language Understanding Modules In Voice Search," 2010 IEEE International Conference on Acoustics Speech and Signal Processing (ICASSP), Mar. 2010. (Accessed Sep. 27, 2012—IEEE) <http://ieeexplore.ieee.org/xpl/articleDetails.jsp?arnumber=5494951>.

Langanke. "Direct Voice Control Speech Data Entry and Database Query Models," International Symposium on Logistics and Industrial Informatics, Sep. 2007. (Accessed Sep. 27, 2012—IEEE) <http://ieeexplore.ieee.org/xpl/articleDetails.jsp?arnumber=4343522>.

Indukuri et al. "Natural Language Querying Over Databases Using Cascaded CRFs," Lecture Notes in Computer Science, Sep. 2010. <http://www.springerlink.com/content/5w1x27650475304m>.

Kolias et al. "Design and implementation of a VoiceXML-driven wiki application for assistive environments on the web," Personal and Ubiquitous Computing, Sep. 2010. vol. 14, No. 6, pp. 527-539. <http://www.icsd.aegean.gr/publication_files/journal/295233664.pdf>.

International Search Report & Written Opinion of the International Searching Authority mailed Dec. 2, 2013 in Patent Cooperation Treaty Application No. PCT/US2013/042097, filed May 21, 2013.

* cited by examiner

SYSTEMS AND METHODS FOR DETERMINING UNDERPLAYED AND OVERPLAYED ITEMS

CROSS REFERENCE TO RELATED APPLICATIONS

This nonprovisional patent application claims the priority benefit of U.S. Provisional Patent Application Ser. No. 61/262,487 filed on Nov. 18, 2009, titled "System and Method for Estimating Song, Artist, and Album Popularity, and Underplayed or Overplayed Items," which is hereby incorporated by reference in its entirety.

FIELD OF THE INVENTION

This invention relates generally to systems and methods for determining items, and more particularly, to systems and methods for determining underplayed or overplayed items.

SUMMARY OF THE INVENTION

Systems, methods and media for determining underplayed or overplayed items are provided herein. One object of the present technology is to provide music recommendations in the form of lists of underplayed or overplayed items to end users. Another object is to track discrepancies in the popularity data for any of the primary and secondary sources, to facilitate the determination of songs that are more or less popular in one arena of music playback or music purchasing than another. Yet another object of the technology is to provide authenticity of certain sources, regardless of whether the source is a primary or secondary source.

In exemplary embodiments, radio play data may be a primary source and music identification service may be a secondary source. A music identification service is any type of service that can identify or determine information regarding music, preferably based on sound recognition. An example of a music identification service is provided in U.S. patent application Ser. No. 12/773,753, filed on May 4, 2010, titled "Systems and Methods for Sound Recognition," which is hereby incorporated by reference in its entirety.

DETAILED DESCRIPTION OF EXEMPLARY EMBODIMENTS

Figure 1:
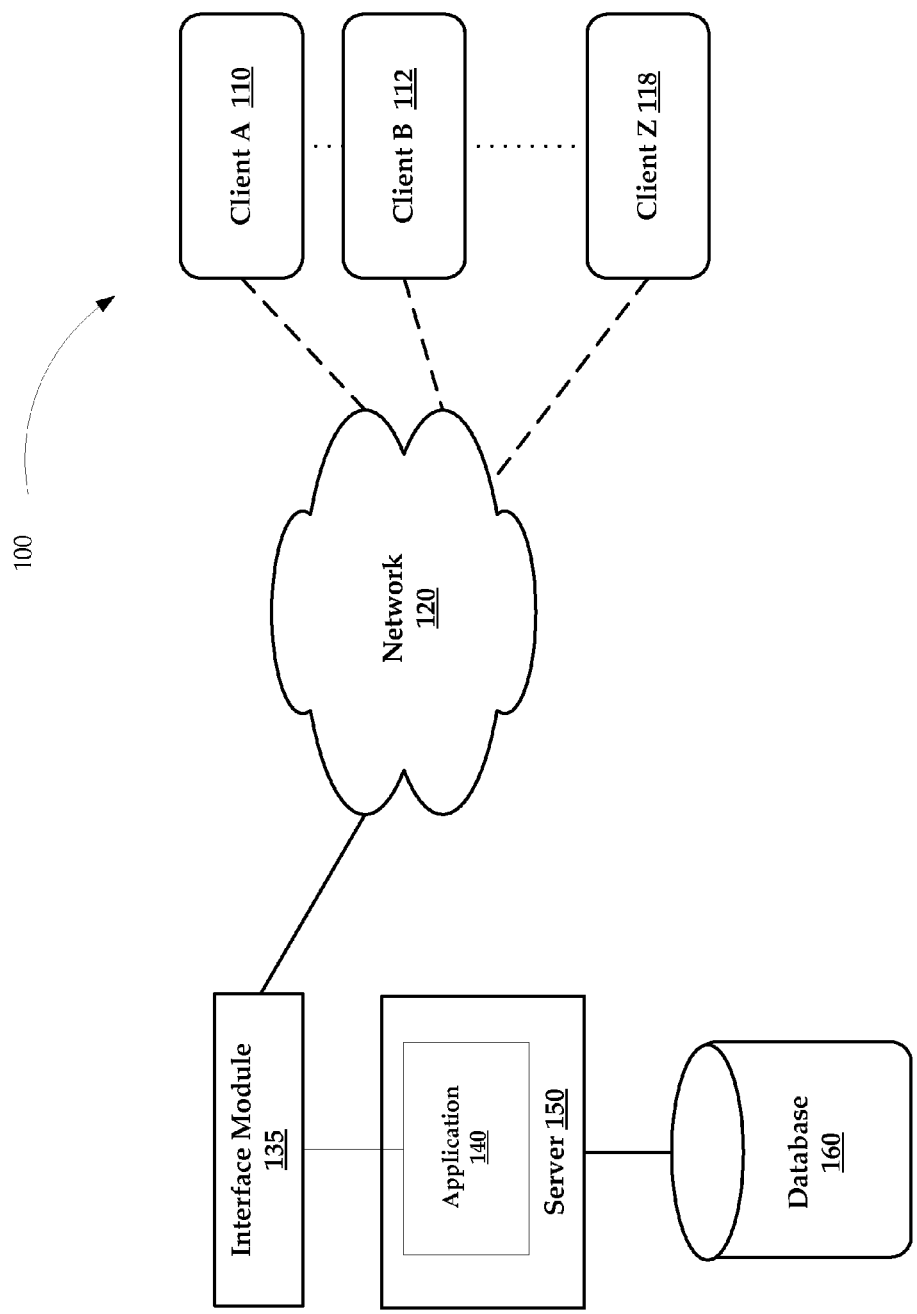
FIG. 1 is a block diagram of an exemplary networking environment in accordance with various embodiments of the present invention.

Embodiments of the present technology provide systems, methods, and media for determining underplayed or overplayed items. Exemplary embodiments include a popularity algorithm for determining underplayed or overplayed items. The popularity algorithm may be stored in memory as executable instructions to be executed by a processor. According to various embodiments, the technology may track discrepancies in popularity data for one or more primary or secondary sources, in order to determine underplayed or overplayed items.

Although the underplayed or overplayed items may include songs, one skilled in the art may recognize that the technology described herein is not limited to songs alone. That is, the technology may be utilized to determine the popularity or the utilization of any type of data, including but not limited to, documents, text, computer programs, audio, video, and any combination thereof. In certain embodiments, methods may allow for data regarding music identifications and radio plays to be utilized in order to determine underplayed or overplayed items. Further details regarding these embodiments are provided later herein.

The terms "underplayed item" as used herein refers to an item that has a high number of identifications and a low number of plays or measure of choice. In contrast, the terms "overplayed item" as used herein refers to an item that has a low number of identifications and a high number of plays or measure of choice. In exemplary embodiments, an "underplayed item" may be an item that end users may want by virtue of having requested the item to be identified by music identification service, and yet radio stations choose not to play this desired song—hence, an "underplayed item." For example, an "underplayed item" may comprise a song that has a high number of music identifications and a low number of radio plays. In further exemplary embodiments, an "overplayed item" may be an item that end users do not want by virtue of the low number of times that the users requested the item to be identified by music identification service, and yet radio stations choose play this desired song repeatedly—hence, an "overplayed item." For example, an "overplayed item" may comprise a song that has a low number of music identifications and a high number of radio plays.

Although a song's number of radio plays per day is discussed herein, one skilled in the art may appreciate that other song-level measures of plays or choice may be used. In a non-exhaustive list, other song-level measures of plays or choice include those measures provided on music websites, mobile devices, social networks, real or virtual music stores. The non-exhaustive list further includes terrestrial radio, internet radio, cable radio, or any other type of data source, where songs receive a large number of plays or equivalent over a short time period, and the play or other registration of a given song is associated with a meaningful source of data, whether human (such as radio disc jockey) or algorithmic (such as music recommendation software). One skilled in the art will recognize that the technology described herein for determining underplayed or overplayed items may be used for any source and is not limited to a comparison of music identifications versus radio plays. Any source or measure of plays or choice, including but not limited to those described in herein, can be utilized with determining underplayed or overplayed items. Furthermore, any comparison of two sources may be utilized for determining underplayed or overplayed items. For example, a song may be determined to be an underplayed item if it was featured on social networks much more than it was sold in virtual music stores. In another example, a song may be determined to be an underplayed item if many more people bought the song than was expected, based on how many listened to the song for free online.

FIG. 1 is a block diagram of an exemplary networking environment 100 in accordance with embodiments of the present invention. In general, the environment 100 may include a computing system having one or more computer programs residing thereon, for example a computing system operated by an end user (such as clients 110-118). In additional exemplary embodiments, the exemplary environment 100 may include both a computing system and a server 150 cooperating together to execute separate components (e.g., module, engine, and the like) of a computer program. As used throughout, the term "computer program" may comprise executable instructions stored in memory.

As depicted in FIG. 1, the networking environment 100 includes clients A 110, B 112, and so forth through client Z 118 (additional or fewer clients may be implemented), a network 120, the server 150 with an application 140, an interface module 135, and an optional database 160. As with all of the figures provided herein, one skilled in the art will recognize that any number of elements 110-160 can be present in the networking environment 100 and that the exemplary methods described herein can be executed by one or more of elements 110-160. Any number of any of elements 110-160 can be present in the networking environment 100, and the networking environment 100 is configured to serve these elements. For example, the server 150 may transmit information via the network 120 to clients 110-118, despite the fact that only three clients are shown in FIG. 1. For all figures mentioned herein, like numbered elements refer to like elements throughout.

Clients 110-118 may be implemented as computers having a processor that runs software stored in memory, wherein the software may include network browser applications (not shown) configured to render content pages, such as web pages, from the server 150. Clients 110-118 can be any computing device, including, but not limited to desktop computers, laptop computers, computing tablets (such as the iPad®), mobile devices, smartphones (such as the iPhone®), and portable digital assistants (PDAs). The clients 110-118 may communicate with a web service provided by the server 150 over the network 120. Additionally, the clients 110-118 may be configured to store an executable application that encompasses one or more functionalities provided by the application 140.

The network 120 can be any type of network, including but not limited to the Internet, LAN, WAN, a telephone network, and any other communication network that allows access to data, as well as any combination of these. The network 120 may be coupled to any of the clients 110-118, the interface module 135, and/or the server 150. As with all the figures provided herewith, the networking environment 100 is exemplary and not limited to what is shown in FIG. 1.

The server 150 can communicate with the network 120 and the database 160. It will be apparent to one skilled in the art that the embodiments of this invention are not limited to any particular type of server and/or database. For example, the server 150 may include one or more application servers, one or more web servers, or a combination of such servers. In some embodiments, the servers mentioned herein are configured to control and route information via the network 120 or any other networks (additional networks not shown in FIG. 1). The servers herein may access, retrieve, store and otherwise process data stored on any of the databases mentioned herein.

Interface module 135 may be implemented as a machine separate from server 150 or as hardware, software, or combination of hardware and software implemented on server 150. In some embodiments, interface module 135 may relay communications between the application 140 and network 120.

The database 160 may be configured to store one or more items (including but not limited to songs, song clips or snippets, speech, voice, and any combination thereof), music features, information about the one or more sounds, information about the music features, or any combination thereof. The database and its contents may be accessible to the application 140. In a non-exhaustive list, the information about the one or more items may include song title, a name of an artist, an artist's biographical information, identification of similar artists, a link to download a song, a link to download a video related to the song, or any combination thereof.

The clients 110-118 may interface with the application 140 on server 150 via the network 120 and the interface module 135. The application 140 may receive requests, queries, and/or data from the clients 110-118. The clients 110-118, may provide data for storage in the database 160, and therefore may be in communication with the database 160. Likewise, the application 140 may access the database 160 based on one or more requests or queries received from the clients 110-118. Further details as to the data communicated in the networking environment 100 are described more fully herein.

Figure 2:
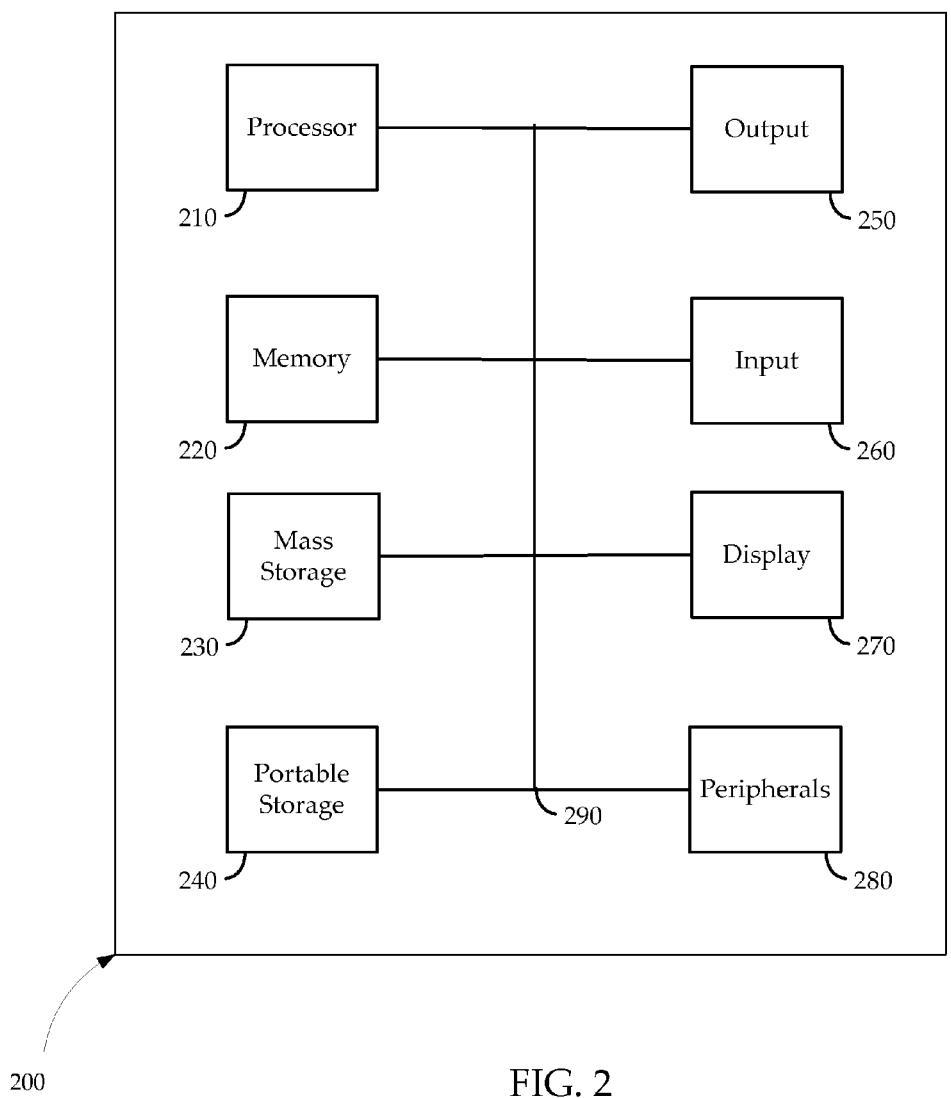
FIG. 2 is a block diagram of an exemplary computing device for determining underplayed or overplayed items in accordance with various embodiments of the present invention.

FIG. 2 is a block diagram of an exemplary computing device for determining underplayed or overplayed items in accordance with embodiments of the present invention. In some embodiments, the exemplary computing device of FIG. 2 can be used to implement portions of the clients 110-118 and the server 150 as shown in FIG. 1.

The computing system 200 of FIG. 2 includes one or more processors 210 and memory 220. The main memory 220 stores, in part, instructions and data for execution by the processor 210. The main memory 220 can store the executable code when in operation. The system 200 of FIG. 2 further includes a mass storage device 230, portable storage medium drive(s) 240, output devices 250, user input devices 260, a graphics display 270, and peripheral devices 280.

The components illustrated in FIG. 2 are depicted as being connected via a single bus 290. However, the components can be connected through one or more data transport means. For example, the processor 210 and the main memory 220 can be connected via a local microprocessor bus, and the mass storage device 230, peripheral device(s) 280, the portable storage device 240, and the display system 270 can be connected via one or more input/output (I/O) buses.

The mass storage device 230, which can be implemented with a magnetic disk drive or an optical disk drive, is a non-volatile storage device for storing data and instructions for use by the processor 210. The mass storage device 230 can store the system software for implementing embodiments of the present invention for purposes of loading that software into the main memory 220.

The portable storage device 240 operates in conjunction with a portable non-volatile storage medium, such as a floppy disk, compact disk or digital video disc, to input and output data and code to and from the computer system 200 of FIG. 2. The system software for implementing embodiments of the present invention can be stored on such a portable medium and input to the computer system 200 via the portable storage device 240.

Input devices 260 provide a portion of a user interface. Input devices 260 may include an alpha-numeric keypad, such as a keyboard, for inputting alpha-numeric and other information, or a pointing device, such as a mouse, a trackball, stylus, or cursor direction keys. Additionally, the system 200 as shown in FIG. 2 includes output devices 250. Examples of suitable output devices include speakers, printers, network interfaces, and monitors.

The display system 270 may include a CRT, a liquid crystal display (LCD) or other suitable display device. Display system 270 receives textual and graphical information, and processes the information for output to the display device.

Peripherals 280 may include any type of computer support device to add additional functionality to the computer system. For example, peripheral device(s) 280 may include a modem or a router.

The components contained in the computer system 200 of FIG. 2 are those typically found in computer systems that can be suitable for use with embodiments of the present invention and are intended to represent a broad category of such computer components that are well known in the art. Thus, the computer system 200 of FIG. 2 can be a personal computer, hand held computing device, telephone, mobile computing device, workstation, server, minicomputer, mainframe computer, or any other computing device. The computer can also include various bus configurations, networked platforms, multi-processor platforms, etc. Various operating systems can be implemented, including Unix, Linux, Windows, Macintosh OS, Palm OS, and other suitable operating systems.

Figure 3:
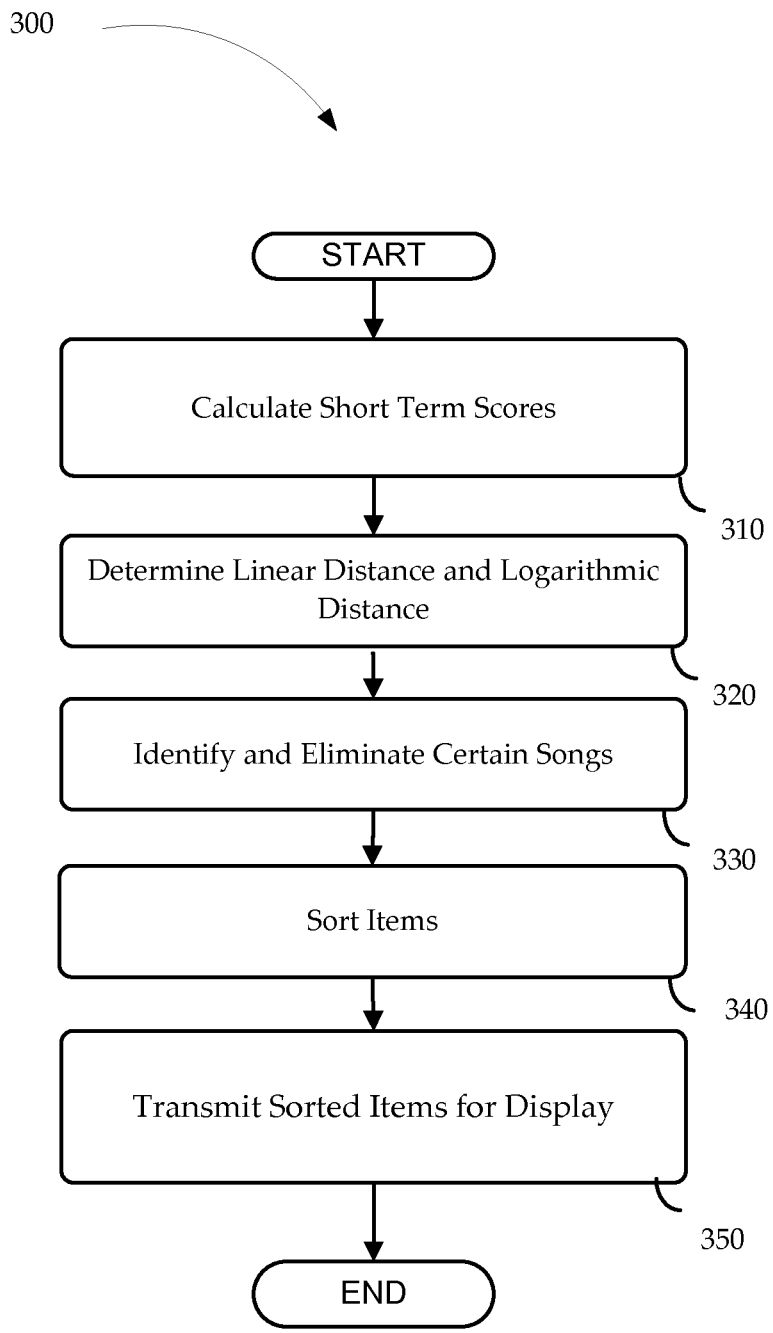
FIG. 3 is a flow diagram of an exemplary method for determining underplayed or overplayed items in accordance with various embodiments of the present invention.

FIG. 3 is a flow diagram of an exemplary method 300 to determine underplayed or overplayed items. According to various embodiments, the determination or calculation of underplayed or overplayed items may be conducted offline, on a regular schedule (such as once a week, daily or hourly). In some embodiments, an end user may request to view a list of underplayed or overplayed items which was previously determined, sorted, or otherwise calculated. In alternative embodiments, the list of underplayed or overplayed items is automatically displayed to the end user on their computing device when the application is opened by the user.

Further to FIG. 3, at step 310, short term scores based on short term popularity data are calculated for both radio data and music identification service data. One should note that at least two data sets may be utilized in order to determine underplayed or overplayed items. The first data set may provide the number of times the given item is played on the radio (radio data). The second data set may provide the number of times a given item is identified using music identification service or sound recognition technology (music identification service data).

According to various embodiments of the invention, the technology may utilize the concept of Virtual Radio Plays per Day on One Million Stations (VRPDOMS). For VRPDOMS, if one monitored 500 stations for a week (7 days), and during that time a song X was played 2100 times, then it would be determined that song X was played an average of 300 times per day on those 500 stations. However, if there were one million stations instead of 500, in such an example, there would be 2,000 times more stations. 2,000 (multiple of more stations) multiplied by 300 (times per day average) equals 600,000 VRPDOMS.

In contrast to one week of monitoring, for short term data, one might only look at a single day VRPDOM score. For one particular day, song X might have 400 plays on 500 stations. As in the previous example, if there were one million stations instead of 500, there would be 2,000 times more stations. In that case, the song's VRPDOM for that day would be 800,000 (2,000 times more stations multiplied by 400 plays).

In exemplary embodiments, determining underplayed items may utilize two short term popularity measures, namely, radio plays and music recognition identifications. In determining underplayed items, one should note that following:

1. A maximum number of VRPDOMs in the last N days is used, where N is between 3 and 15, with 7 being an ideal number. This calculation rewards newly hot songs (usually hottest on the most recent valid day) while allowing "cooling" songs to cool gracefully and not be unduly punished for having a particularly weak day in the past few days. This is important, because there is a certain amount of "noise" or instability in any data source.

2. Normalize using the one million stations or the total number of music identifications from the service, such that the used value for short term popularity has comparable units to radio plays per day on one million stations. For example, for identifications in a short term system, there is a number of total identifications, not one million "stations." Therefore, the percentage of total successful identification queries is mapped to a VRPDOMS number. For example, if there are 1,000,000 queries on a day that returned a positive result, and a particular song had 4,000 of them, this represents 0.4% of all successful queries that day. To obtain a comparable VRPDOMS number for this day, the average number of songs a single radio station plays per day is determined through an analysis of radio data. If there are 200 songs per day average per station, then 1,000,000 stations playing 200 songs each per day is 200 million song plays. Taking 0.4% of 200 million song plays provides 800,000 short term identification VRPDOMS.

At step 320, both linear distance (distance) and logarithmic distance (ratio) between the radio virtual radio plays per days on one million stations (VRPDOMS) and the identification VRPDOMS are determined. For a given song, if in step 310, the short term scores were be determined to be 2,000 music identification plays and 1,000 radio plays, then 2,000 music identification plays is 2% identification VRPDOMS, while 1,000 radio plays of a given song is 1% radio VRPDOMS. The linear distance is 2%–1%=1. The logarithmic distance (ratio) is a 2.0 ratio since there exists a 2 to 1 ratio for identification VRPDOMS to radio VRPPDOMS.

At step 330, songs that do not have the minimum requisite number of radio VRPDOMS or identification VRPDOMS are identified and eliminated. In exemplary embodiments, the minimum requisite number for either radio VRPDOMS or identification VRPDOMS is 7,000, although numbers as low as 5,000 or as high as 15,000 may also work well.

In an optional step (not shown), further songs may be eliminated. In exemplary embodiments, for determining underplayed songs, songs whose ratio between identification VRPDOMS and radio VRPDOMS is below 2.0 are eliminated. Values other than 2.0 may be utilized. Thus, in further embodiments, songs whose ratio between identification VRPDOMS and radio VRPDOMS below 1.25 or below 3.0 may be eliminated in determining underplayed songs. In alternative exemplary embodiments, for determining overplayed songs, songs whose ratio between identification VRPDOMS and radio VRPDOMS is above 1/2.0 are eliminated. In further exemplary embodiments, for determining overplayed songs, songs whose ratio between identification VRPDOMS and radio VRPDOMS is above 1/1.25 or above 1/3.0 may be eliminated.

At step 340, once the elimination of certain songs that are identified in step 330 has taken place, a list of underplayed or overplayed items are sorted, either by listing those songs having the largest linear distance (distance) first or the largest logarithmic distance (ratio) first.

Finally, at step 350, information in the form of a sorted list of underplayed or overplayed items is transmitted to display on the computing device (such as to the display 270 of the computing device 200 of FIG. 2). The information may then be viewed by the user of the computing device. In a non-exhaustive list, the information regarding the items may comprise a song title, a name of an artist, an artist's biographical information, identification of similar artists, a link to download a song, a link to download a video related to the song, or any combination thereof.

In an optional step, the sorted list of underplayed or overplayed items is published, posted or otherwise provided via the Internet. Another optional step is that every time a song is recognized by music identification or sound recognition technology, such an event is logged and may be stored on memory.

In yet another optional step, user input is received from a computing device requesting a determination of underplayed or overplayed items. In some embodiments, the user input is provided through any type of input device of the computing device (such as input device 260 of FIG. 2), including but not limited to a keyboard, a mouse, and the like. User input may include any number of manual user inputs, such as keystrokes, user selection, commands, mouse clicks, presses on a touch screen, swipes of a touch screen, or button presses via the one or more computing devices. In exemplary embodiments, the user input may be an actuation of a menu button labeled "What's Hot.

One skilled in the art will recognize that the scope of the present technology allows for any order or sequence of the steps of the method 300 mentioned herein to be performed. Also, it will be appreciated by one skilled in the art that the steps in the method 300 may be removed altogether or replaced with other steps (such as the optional steps described herein) and still be within the scope of the invention.

Calculations as provided throughout the method 300 may be accomplished dynamically ("on-the-fly") or on a periodic basis. The technology further allows for any portion of the method 300 to be automated, including but not limited to an automatic generation of a sorted list of underplayed or overplayed list.

Certain minimums of plays (such as 4 times or 20 times) may be required for a song to be listed on an underplayed song list to prevent fraud or gaming. Also, to prevent fraud, further measures may be implemented. For instance, a song that may be identified 100 times utilizing a music identification service or sound recognition technology via a single computing device or phone will only be counted as having been identified once. Another example of an anti-fraud measure is that a plurality of identifications of a song recorded during a time interval may be weighted less than identifications recorded outside the time interval or at different times, such as in the case of where a particular live event causes a plurality of end users to attempt to identify a given song simultaneously or near-simultaneously.

Moreover, the technology allows for utilizing on demand radio play as a more legitimate source (such as utilizing an on demand radio service that charges a monthly subscription), as compared to the less legitimate source of commercial radio. Also, the technology encompasses embodiments of social networking and sharing. Thus, for purposes of determining underplayed or overplayed items, the technology may count or track the number of times an end user (and possibly their friends) provided a positive recommendation of a song (such as with a review or an indicator that one "likes" a song on a social network). The technology may also log the sharing of songs (such as where an end user shares a song through a partner site). The technology may further track the number of plays that a song is played by virtue of being listed on a list of underplayed or overplayed items. Finally, the technology may provide an extra bonus or reward if an end user indicates a positive music recommendation of one song over another.

Those skilled in the art may appreciate that any of the factors, sources, plays or other measures of choice mentioned herein may be utilized in determining underplayed or overplayed items. Furthermore, any of the factors, sources, plays or other measures of choice mentioned herein may be serve as data for music identifications. For example, if a music identification ID counted as 10 VRPDOMs, a positive recommendation might count as an additional 5 or 20 VRPDOMs. In another example, the music recommendation VRPDOMs could be used in their own determination or calculation of underplayed items.

It will be appreciated by one skilled in the art that any number of applications and databases may be used with this technology to implement one or more methods described herein.

Some of the above-described functions may be composed of instructions that are stored on storage media (e.g., computer-readable medium). The instructions may be retrieved and executed by the processor. Some examples of storage media are memory devices, tapes, disks, and the like. The instructions are operational when executed by the processor to direct the processor to operate in accord with the invention. Those skilled in the art are familiar with instructions, processor(s), and storage media.

It is noteworthy that any hardware platform suitable for performing the processing described herein is suitable for use with the invention. The terms "computer-readable storage medium" and "computer-readable storage media" as used herein refer to any medium or media that participate in providing instructions to a CPU for execution. Such media can take many forms, including, but not limited to, non-volatile media, volatile media and transmission media. Non-volatile media include, for example, optical or magnetic disks, such as a fixed disk. Volatile media include dynamic memory, such as system RAM. Transmission media include coaxial cables, copper wire and fiber optics, among others, including the wires that comprise one embodiment of a bus. Transmission media can also take the form of acoustic or light waves, such as those generated during radio frequency (RF) and infrared (IR) data communications. Common forms of computer-readable media include, for example, a floppy disk, a flexible disk, a hard disk, magnetic tape, any other magnetic medium, a CD-ROM disk, digital video disk (DVD), any other optical medium, any other physical medium with patterns of marks or holes, a RAM, a PROM, an EPROM, an EEPROM, a FLASHEPROM, any other memory chip or cartridge, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents.

While the present invention has been described in connection with a series of preferred embodiment, these descriptions are not intended to limit the scope of the invention to the particular forms set forth herein. It will be further understood that the methods of the invention are not necessarily limited to the discrete steps or the order of the steps described. To the contrary, the present descriptions are intended to cover such alternatives, modifications, and equivalents as may be included within the spirit and scope of the invention as defined by the appended claims and otherwise appreciated by one of ordinary skill in the art.

What is claimed is:

1. A method for determining a list of items, comprising:
executing instructions stored in memory by a processor to:
calculate short term scores for radio data and music identification service data of the items, the short term scores for radio data comprising number of times an item is played on radio and the short term scores for music identification service data comprising number of times an item is identified using a music identification service,
determine linear distance and logarithmic distance between radio virtual radio plays per days on one million stations (VRPDOMS) and identification virtual radio plays per days on one million stations of the items,
identify and eliminate items from the list of items lacking minimum requisite number of radio VRPDOMS or identification VRPDOMS, and
sort the list of items by largest linear distance or largest logarithmic distance first; and
transmitting for display the sorted list of items to a computing device.

2. The method of claim 1, wherein information regarding the items comprises a song title, a name of an artist, an artist's biographical information, identification of similar artists, a link to download a song, a link to download a video related to the song, or any combination thereof.

3. The method of claim 1, wherein the items are underplayed items.

4. The method of claim 3, wherein the underplayed items comprise underplayed songs.

5. The method of claim 4, further comprising identifying and eliminating underplayed songs from the list of items whose ratio between identification VRPDOMS and radio VRPDOMS is below 2.

6. The method of claim 4, further comprising identifying and eliminating underplayed songs from the list of items whose ratio between identification VRPDOMS and radio VRPDOMS is below 1.25.

7. The method of claim 4, further comprising identifying and eliminating underplayed songs from the list of items whose ratio between identification VRPDOMS and radio VRPDOMS is below 3.0.

8. The method of claim 1, wherein the items are overplayed items.

9. The method of claim 8, wherein the overplayed items comprise overplayed songs.

10. The method of claim 9, further comprising identifying and eliminating overplayed songs from the list of items whose ratio between identification VRPDOMS and radio VRPDOMS is above 1/2.0.

11. The method of claim 9, further comprising identifying and eliminating overplayed songs from the list of items whose ratio between identification VRPDOMS and radio VRPDOMS is above 1/1.25.

12. The method of claim 9, further comprising identifying and eliminating overplayed songs from the list of items whose ratio between identification VRPDOMS and radio VRPDOMS is above 1/3.0.

13. The method of claim 1, further comprising receiving user input from the computing device, the user input requesting a determination of the items.

14. A non-transitory computer readable storage medium having embodied thereon a program, the program being executable by a processor to perform a method for determining a list of items, the method comprising:
executing instructions stored in memory by a processor to:
calculate short term scores for radio data and music identification service data of the items, the short term scores for radio data comprising number of times an item is played on radio and the short term scores for music identification service data comprising number of times an item is identified using a music identification service,
determine linear distance and logarithmic distance between radio virtual radio plays per days on one million stations (VRPDOMS) and identification virtual radio plays per days on one million stations of the items,
identify and eliminate items from the list of items lacking minimum requisite number of radio VRPDOMS or identification VRPDOMS, and
sort the list of items by largest linear distance or largest logarithmic distance first; and
transmitting for display the sorted list of items to a computing device.

15. The computer readable storage medium of claim 14, wherein information regarding the items comprises a song title, a name of an artist, an artist's biographical information, identification of similar artists, a link to download a song, a link to download a video related to the song, or any combination thereof.

16. The computer readable storage medium of claim 14, wherein the items are underplayed items.

17. The computer readable storage medium of claim 16, wherein the underplayed items comprise underplayed songs.

18. The computer readable storage medium of claim 17, further comprising identifying and eliminating underplayed songs from the list of items whose ratio between identification VRPDOMS and radio VRPDOMS is below 2.

19. The computer readable storage medium of claim 17, further comprising identifying and eliminating underplayed songs from the list of items whose ratio between identification VRPDOMS and radio VRPDOMS is below 1.25.

20. The computer readable storage medium of claim 17, further comprising identifying and eliminating underplayed songs from the list of items whose ratio between identification VRPDOMS and radio VRPDOMS is below 3.0.

21. The computer readable storage medium of claim 14, wherein the items are overplayed items.

22. The computer readable storage medium of claim 21, wherein the overplayed items comprise overplayed songs.

23. The computer readable storage medium of claim 22, further comprising identifying and eliminating overplayed songs from the list of items whose ratio between identification VRPDOMS and radio VRPDOMS is above 1/2.0.

24. The computer readable storage medium of claim 22, further comprising identifying and eliminating overplayed songs from the list of items whose ratio between identification VRPDOMS and radio VRPDOMS is above 1/1.25.

25. The computer readable storage medium of claim 22, further comprising identifying and eliminating overplayed songs from the list of items whose ratio between identification VRPDOMS and radio VRPDOMS is above 1/3.0.

26. The computer readable storage medium of claim 22, further comprising receiving user input from the computing device, the user input requesting a determination of the items.

27. A system for determining a list of items, comprising:
a computing device having a display;
a processor configured to execute instructions stored in memory to:

execute instructions stored in memory by a processor to:
- calculate short term scores for radio data and music identification service data of the items, the short term scores for radio data comprising number of times an item is played on radio and the short term scores for music identification service data comprising number of times an item is identified using a music identification service,
- determine linear distance and logarithmic distance between radio virtual radio plays per days on one million stations (VRPDOMS) and identification virtual radio plays per days on one million stations of the items,
- identify and eliminate items from the list of items lacking minimum requisite number of radio VRPDOMS or identification VRPDOMS, and
- sort the list of items by largest linear distance or largest logarithmic distance first; and
- transmit for display the sorted list of items to a computing device.

28. The system of claim 27, wherein information regarding the items comprises a song title, a name of an artist, an artist's biographical information, identification of similar artists, a link to download a song, a link to download a video related to the song, or any combination thereof.

29. The system of claim 27, wherein the items are underplayed items.

30. The system of claim 29, wherein the underplayed items comprise underplayed songs.

31. The system of claim 30, further comprising identifying and eliminating underplayed songs from the list of items whose ratio between identification VRPDOMS and radio VRPDOMS is below 2.

32. The system of claim 30, further comprising identifying and eliminating underplayed songs from the list of items whose ratio between identification VRPDOMS and radio VRPDOMS is below 1.25.

33. The system of claim 30, further comprising identifying and eliminating underplayed songs from the list of items whose ratio between identification VRPDOMS and radio VRPDOMS is below 3.0.

34. The system of claim 27, wherein the items are overplayed items.

35. The system of claim 34, wherein the overplayed items comprise overplayed songs.

36. The system of claim 35, further comprising identifying and eliminating overplayed songs from the list of items whose ratio between identification VRPDOMS and radio VRPDOMS is above 1/2.0.

37. The system of claim 35, further comprising identifying and eliminating overplayed songs from the list of items whose ratio between identification VRPDOMS and radio VRPDOMS is above 1/1.25.

38. The system of claim 35, further comprising identifying and eliminating overplayed songs from the list of items whose ratio between identification VRPDOMS and radio VRPDOMS is above 1/3.0.

39. The system of claim 27, further comprising receiving user input from the computing device, the user input requesting a determination of the items.

* * * * *